(12) United States Patent
Basler

(10) Patent No.: US 11,001,360 B2
(45) Date of Patent: May 11, 2021

(54) DEVICE FOR MONITORING A BOAT DRIVE

(71) Applicant: Torqeedo GmbH, Gilching (DE)

(72) Inventor: Hendrik Basler, Munich (DE)

(73) Assignee: Torqeedo GmbH, Gilching (DE)

( * ) Notice: Subject to any disclaimer, the term of this patent is extended or adjusted under 35 U.S.C. 154(b) by 52 days.

(21) Appl. No.: 16/282,107

(22) Filed: Feb. 21, 2019

(65) Prior Publication Data

US 2019/0256184 A1    Aug. 22, 2019

(30) Foreign Application Priority Data

Feb. 22, 2018   (DE) .................. DE10 2018 104 068

(51) Int. Cl.
| | | |
|---|---|---|
| B63H 21/17 | (2006.01) | |
| B63H 21/21 | (2006.01) | |
| H01M 10/48 | (2006.01) | |
| H02H 7/18 | (2006.01) | |
| B60L 3/04 | (2006.01) | |
| B60L 3/00 | (2019.01) | |
| B63H 23/24 | (2006.01) | |
| H01M 50/572 | (2021.01) | |
| G08B 21/18 | (2006.01) | |
| B63B 43/00 | (2006.01) | |

(52) U.S. Cl.
CPC ............ B63H 21/21 (2013.01); B60L 3/0084 (2013.01); B60L 3/04 (2013.01); B63H 21/17 (2013.01); B63H 23/24 (2013.01); H01M 10/488 (2013.01); H01M 50/572 (2021.01); H02H 7/18 (2013.01); *B60L 2200/32* (2013.01); *B63B 2043/006* (2013.01); *B63B 2209/02* (2013.01); *B63H 2021/216* (2013.01); *G08B 21/182* (2013.01); *H01M 2220/20* (2013.01)

(58) Field of Classification Search
CPC ........ B63H 21/17; B63H 21/21; B63B 43/00; B63B 79/00; B63B 43/02; B63B 2043/006; G08B 21/182
See application file for complete search history.

(56) References Cited

U.S. PATENT DOCUMENTS 5,357,247 A * 10/1994 Marnel .................. B63B 43/00
                                                              114/183 R
5,576,582 A    11/1996 White
(Continued)

FOREIGN PATENT DOCUMENTS

CN    203337420 U    12/2013
CN    204548469 U    8/2015
(Continued)

OTHER PUBLICATIONS

European Search Report issued in European counterpart application No. 19158811.0-1015 dated Jun. 25, 2019, with Statement of Relevancy (Eight (8) pages).
(Continued)

*Primary Examiner* — Andrew Polay
(74) *Attorney, Agent, or Firm* — Crowell & Moring LLP

(57) ABSTRACT

A device for monitoring a boat drive, preferably for monitoring a drive battery of a boat drive, includes a first water sensor configured to switch off the boat drive when a first water level is reached, and a second water sensor configured so as to output a water level warning when a second water level is reached.

13 Claims, 1 Drawing Sheet

(56) References Cited

U.S. PATENT DOCUMENTS

| | | | |
|---|---|---|---|
| 5,939,975 A * | 8/1999 | Tsuria | B60R 25/33 |
| | | | 340/426.18 |
| 8,944,865 B1 | 2/2015 | Krabacher et al. | |
| 2009/0050042 A1 * | 2/2009 | Waldecker | B63J 4/004 |
| | | | 114/183 R |
| 2015/0288036 A1 * | 10/2015 | Hartmeyer | B63B 43/00 |
| | | | 429/50 |

FOREIGN PATENT DOCUMENTS

| | | |
|---|---|---|
| CN | 106184684 A | 12/2016 |
| EP | 2 730 492 A1 | 5/2014 |
| JP | 2013-74707 A | 4/2013 |
| WO | WO 2014/072071 A1 | 5/2014 |

OTHER PUBLICATIONS

German Office Action issued in German counterpart application No. 10 2018 104 068.7 dated Jan. 24, 2019 (Six (6) pages).

Chinese-language Chinese Office Action issued in Chinese application No. 201910132002.9 dated Aug. 14, 2020 (Seven (7) pages).

* cited by examiner

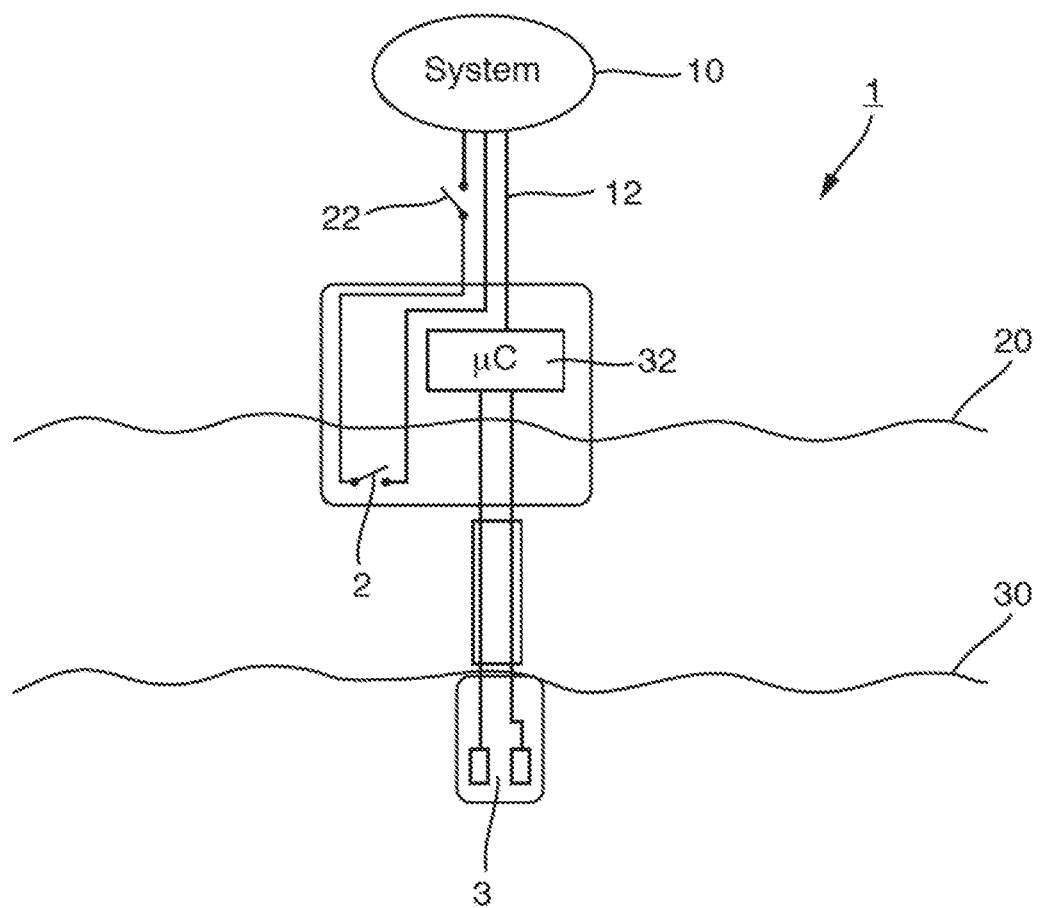

DEVICE FOR MONITORING A BOAT DRIVE

CROSS REFERENCE TO RELATED APPLICATIONS

This application claims priority under 35 U.S.C. § 119 from German Patent Application No. 10 2018 104 068.7, filed Feb. 22, 2018, the entire disclosure of which is herein expressly incorporated by reference.

BACKGROUND AND SUMMARY OF THE INVENTION

The present invention relates to a device for monitoring a boat drive, preferably for monitoring a drive battery of a boat drive, which is provided for example in boats having an electric drive.

It is known from the prior art that drive batteries for boats which are powered by an electric motor can be provided with a detection circuit for detection of immersion of the drive battery. This detection circuit serves to switch off the drive battery when it is immersed in water. In this way damage to the drive battery itself, as well as damage due to electric shocks, short-circuits and explosions can be reduced or even completely ruled out when the drive battery is submerged.

Such a detection circuit is provided for example in the drive batteries designated as Power 26-104 from the applicant and is configured for example in such a way that the detection circuit is designed for detection of the submersion of a resonant circuit, the capacitor of which is in principle formed between the poles of the battery or a contact and a pole of the battery and the corresponding natural vibration of the resonant circuit is evaluated. If there is a shift of the natural frequency, it may be assumed that the dielectric present between the poles of the battery or between the contact and a pole of the battery has changed. In particular the dielectric between the poles and/or contacts changes if the drive battery is submerged, so that accordingly the capacitance of the capacitor of the resonant circuit is changed and as a result the natural frequency of the resonant circuit changes. In this way it can be ascertained whether the two poles or one pole and one contact of the drive battery are located in the water.

The detection circuit which evaluates whether submersion of the drive battery takes place is usually directly connected to an operating switch of the battery inside the battery. The operating switch provides a contact between the respective poles and the battery cells. The operating switch is usually arranged inside the housing of the drive battery and is switched on and off by means of an external switching signal.

The drive battery can usually be switched by means of a battery management system and/or an external control means in order to switch on the drive battery for the operation accordingly or to switch it off again after operation or for transport. The described device for switching off the battery in the event of submersion acts directly on this operating switch.

Starting from this known prior art, it is an object of the present invention to provide a device for monitoring a boat drive which has a further improved functionality and provides an improved protection for the boat drive.

This object is achieved by a device with the features of claim 1. Advantageous embodiments are apparent from the dependent claims, the present description as well as the appended drawings.

Accordingly, a device for monitoring a boat drive, preferably for monitoring a drive battery of a boat drive, is proposed which comprises a first water sensor which is configured to switch off the boat drive when a first water level is reached. According to the invention a second water sensor is provided which is configured so as to output a water level warning when a second water level is reached.

Because a second water sensor is provided which is configured so as to output a water level warning when a second water level is reached, the safety level for the boat drive overall is raised further.

In particular in this way it is possible to detect the presence of water already in the event of a lower water level in the region of the boat drive and in particular in the region of the drive battery of the boat drive and in this way to ascertain that water is actually present in this region. In this way it is possible to evaluate whether this detected water possibly constitutes a danger for the boat drive and in particular for the drive battery. Accordingly, at this time measures can also be implemented in order to prevent damage to the boat drive and in particular to the drive battery.

The second water level is preferably arranged below the first water level. In this case the first water sensor and the second water sensor are preferably arranged in the compartment of the boat in which the boat drive, in particular a drive battery, is arranged. In this case the first water sensor and the second water sensor are preferably arranged in the same compartment—for example one above the other.

In this way it is possible to determine the rise in a water level inside the relevant compartments for the boat drive. This determination can then be carried out before damage to the boat drive occurs and before the water level has for example reached the poles of a drive battery of the boat drive.

The first water sensor is preferably also housed in a component of the boat drive. The first water sensor can be particularly preferably housed in the drive battery and particularly preferably a first water sensor can be housed in each case in several or all drive batteries.

The first water sensor can then be directly connected by means of a hardware connection to an operating switch of the drive battery, so that when the first water level is reached a direct switching off of the drive battery takes place by the actuation of the operating switch of the drive battery. Accordingly, in a first step the drive battery is substantially autonomous with respect to the switching off by the first water sensor and is not tied to the other components of the boat drive. In particular, the power required for operation of the first water sensor can also be provided by the drive battery.

However, the first water sensor can preferably also be arranged outside a drive battery of the boat drive and can be directly connected by means of a hardware connection to an operating switch of the drive battery or the operating switches of a plurality of drive batteries. Thus, it is possible to arrange the first water sensor at a height in the compartment of the boat which houses the drive batteries or other components of the boat drive at which there can still be a risk of damage to the components. In particular, the first water sensor can also be arranged at a height below the poles of the drive battery.

Nevertheless, in an arrangement outside the drive battery the first water sensor can be supplied with power by the drive battery, so that switching off of the drive battery when the first water level is reached can also take place autonomously without other systems of the boat drive being required for this purpose.

In this case a first water sensor arranged outside the drive battery can be directly connected by means of a hardware connection to the operating switch of the drive battery. The first water sensor can also be connected to the operating switches of a plurality of drive batteries.

In this case the second water level can preferably be arranged below the first water level so that the first water level corresponds to the water level at which the poles of a drive battery of the boat drive are submerged or not yet submerged and the second water level corresponds to a water level which is arranged below the first water level so that there is no risk of damage to the boat drive and in particular damage to a drive battery of the boat drive. Thus, the presence of water in a compartment relevant for the boat drive can be detected before the water can become a problem for the boat drive.

In other words, the first water sensor is preferably arranged above the second water sensor and in particular the first water level is preferably arranged above the second water level.

In a preferred further embodiment, the first water sensor is connected by means of a hardware connection to the boat drive, in particular to a drive battery of the boat drive, in order to switch off the boat drive directly when the first water level is reached and in particular to switch off a drive battery of the boat drive directly.

Accordingly, the first water sensor is preferably configured to switch off the boat drive directly. In particular the first water sensor is configured to switch off the boat drive without bypassing a control system—for example a system control or a battery management system. Thus, by means of the first water sensor a safe, hardware-based switching off of the boat drive can be achieved as soon as a critical water level is detected by the first water sensor. This is the case for example when the poles of a drive battery of the boat drive are submerged.

Accordingly, the direct switching off of the boat drive by means of the first water sensor can ensure that further components which may possibly be susceptible to water damage are not involved and safe hardware-based switching off is achieved for example in the event of submersion of the poles of the drive battery.

The hardware connection can also ensure that errors, interference or deceleration due to the communication by means of a system bus with a control system can have no effect on the direct and immediate switching off of the boat drive and in particular on the reaction speed. In fact, the first water sensor switches off the boat drive directly in the event of a dangerous water level.

Accordingly, the safety level of the boat drive can be raised overall.

The second water sensor preferably communicates by means of a system bus with a control system of the boat drive, and the control system is configured to output a warning to a user upon reception of the water level warning from the second water sensor.

In this case the control system of the boat drive is particularly preferably configured to reduce the power of the boat drive upon reception of the water level warning.

The control system of the boat drive can preferably be configured so that upon reception of a water level warning a sequence for switching off the boat drive is initiated, preferably after the expiration of a predetermined time period.

The control system is preferably also configured to take steps which counteract a rise in the water level to a critical water level and/or is configured to output a warning to a user of the boat drive.

In particular, the control system can be configured so that for example it activates a bilge pump as soon as the second water level sensor communicates to the control system that a predetermined water level has been reached. The water can then be discharged from the respective compartments of the boat by means of the bilge pump so that switching off of the boat drive or switching off of the drive battery of the boat drive can possibly be avoided.

Furthermore, a warning message can be output to the user of the boat drive indicating that a water level in the boat has been reached which is still problem-free without further change, but it must be observed and could lead to a dangerous state.

Furthermore, the control system can be configured so that in reaction to the reception of a water level warning from the second water sensor the power of the boat drive is reduced in order to signal to the user of the boat that an intervention is necessary and that a potential danger exists.

In a preferred further embodiment, the first water sensor also communicates with a control system of the boat drive by means of a system bus, and the control system is configured to switch off the boat drive also by means of a control command upon reception of a switch-off message from the first water sensor. Systems of the boat drive other than those which are switched off directly by means of the first water sensor can be switched off by the control command. In other words, not only is the boat drive switched off directly by the first water sensor but also the boat drive is switched off by means of a control command through the signaling of the control system.

Particularly preferably the control system is configured to output a warning to a user upon reception of a message about the switching off of the boat drive from the first water sensor.

Thus, when the first water level, that is to say the critical water level, in the boat is reached, a direct switching off of the boat drive is achieved and simultaneously, however, the control system of the boat is also informed by means of the communication via the system bus that the first water sensor has switched off the boat drive. Accordingly, in this case the user of the boat drive receives a message about the reason for switching off and can initiate corresponding measures. The control system can also activate a bilge pump in order to reduce the water level again.

The first water sensor is preferably connected in series to an emergency off switch of the boat drive. In other words, the first water sensor is arranged at the same hierarchical level as the emergency off switch arranged and likewise allows immediate access to the switching off of the boat drive.

The control system is preferably configured so that, upon reception of a water level warning from the second water sensor and/or upon reception of a message about the switching off of the boat drive from the first water sensor, it switches on a bilge pump to remove the water from the boat.

BRIEF DESCRIPTION OF THE DRAWINGS

Preferred further embodiments of the invention are explained in greater detail by the following description of the drawing. In the drawing:

FIG. 1 shows a schematic representation of a possible exemplary embodiment of a device for monitoring a boat drive.

DETAILED DESCRIPTION OF THE DRAWINGS

Preferred exemplary embodiments are described below with reference to the drawing.

FIG. 1 shows a schematic view of a device 1 for monitoring a boat drive.

The boat drive is indicated by way of example by means of the control system 10. The boat drive can for example comprise a drive battery, a battery control, a drive control, a power electronics unit and/or an electric motor for the boat. These and other components for driving a boat with an electric motor should be understood as a boat drive.

The control system 10 can either be provided as a higher-level control system, which controls and monitors some or all of the components of the boat drive, or only one specific component of the boat drive can also be provided as the control system. A typical example of a control system of the boat drive is a battery management system which takes on the control and monitoring of one, several or all drive batteries of the boat drive. Amongst other things, a battery management system can switch on and switch off the drive battery or batteries, in order to prepare the drive battery or batteries for use and/or in order to switch off the drive battery or batteries after use and thus to put it or them into a safe state.

In the device 1 a first water sensor 2 is provided, which directly switches off the boat drive when a schematically indicated first water level 20 is reached.

The first water sensor 2 is shown here in the form of a hardware-based switch. The first water sensor 2 can also act directly on a hardware-based switch, by which the boat drive can be directly switched off. For example, the first water sensor 2 can directly switch off a drive battery or several or all drive batteries by actuation of the hardware-based switch.

The first water sensor 2 can also be provided for example in a drive battery or in a plurality of or all drive batteries and can act directly on an operating switch of the respective drive battery, in order in this way to achieve direct switching off of the drive battery as soon as the first water level 20 is reached and accordingly a dangerous state for the drive battery has been reached.

In other words, the first water sensor 2 acts directly on the boat drive and accordingly the communication of sensor signals by means of a system bus to a control system, as well as the evaluation of the sensor signal and the conversion into a switch-off signal and also the communication of the switch-off signal to a switch of the boat drive, are not necessary here. In fact, without these intermediate steps the hardware-based switch which forms the first water sensor 2 can achieve direct switching off of the boat drive. Thus, delays or errors in the communication and/or in the evaluation are ruled out and safe and fast switching off can be achieved.

The hardware-based switch of the first water sensor 2 is preferably series-connected to an emergency off switch 22 of the boat drive and thus is at the same hierarchical level as the emergency off switch 22 and has the same immediacy of the protective mechanism.

The first water sensor 2 can be formed for example by a float system or by the above-mentioned system of measurement of a capacitance between two poles or between two electrodes of a battery which jointly form a capacitor of a resonant circuit.

Accordingly, the first water sensor 2 can be provided for example to immediately directly switch off a drive battery of the boat drive as soon as the poles of the battery are immersed in water or are at risk of immersion. This is absolutely necessary in order to avoid destruction of the boat drive and in particular of the drive battery. Furthermore, the risk of explosion on the boat associated with the submersion of the battery can be reduced by switching off of the battery, since the occurrence of electrolysis of the (salt) water is avoided and accordingly also no oxyhydrogen gas is produced.

The first water sensor 2 can be directly connected by means of a hardware connection to an operating switch of the drive battery, so that when the first water level is reached a direct switching off of the drive battery takes place by the actuation of the operating switch of the drive battery. Accordingly, in a first step the drive battery is substantially autonomous with respect to the switching off by the first water sensor 2 and is not tied to the other components of the boat drive. In particular, the power required for operation of the first water sensor 2 can also be provided by the drive battery.

However, the first water sensor 2 can preferably also be arranged outside a drive battery of the boat drive and can be directly connected by means of a hardware connection to an operating switch of the drive battery or the operating switches of a plurality of drive batteries. Thus, it is possible to arrange the first water sensor 2 at a height in the compartment of the boat which houses the drive batteries or other components of the boat drive at which there can still be risk of damage to the components. In particular, the first water sensor 2 can also be arranged at a height below the poles of the drive battery.

Nevertheless, in an arrangement outside the drive battery the first water sensor 2 can be supplied with power by the drive battery, so that switching off of the drive battery when the first water level 20 is reached can also take place autonomously without other systems of the boat drive being required for this purpose.

In this case a first water sensor 2 arranged outside the drive battery can be directly connected by means of a hardware connection to the operating switch of the drive battery. The first water sensor 2 can also be connected to the operating switches of a plurality of drive batteries.

Furthermore, the device 1 comprises a second water sensor 3, which communicates a water level warning to the control system 10 of the boat drive when a schematically illustrated second water level 30 is reached. As shown schematically in FIG. 1, the second water sensor 3 is arranged in a lower position relative to the first water sensor 2, so that when a water level warning is output by the second water sensor 3 first of all a water level is reached which still does not lead to immediate damage to the boat drive, but represents a warning level for the water level in the boat at which the user or driver of the boat must be warned about the presence of water in the region of the boat drive and thus about any water ingress.

Thus, accordingly the first water sensor 2 is arranged at a higher level inside the boat, which corresponds to a level at which damage to the boat drive is to be expected or specifically is not yet to be expected. As just described, this level of the first water sensor 2 can be predetermined for example by the arrangement of the poles of the drive battery of the boat drive, since submersion of the poles can lead to safety problems.

The second water sensor 3 is provided in the form of a water sensor 3 which communicates with a system bus 12, in particular a CAN bus of the boat drive.

The system bus 12 communicates with the second water sensor 3 by means of a correspondingly configured microprocessor 32, which on the one hand performs continuous monitoring of the second water sensor 3 and which on the other hand performs the communication between the water sensor 3 and the system bus 12.

When water is present at the water level 30 at which the second water sensor 3 reacts, a water level warning is correspondingly output to the system bus 12, for example by means of the microprocessor 32, wherein the water level warning is then relayed by means of the system bus 12 to the control system 10.

Thus, it can be ensured that a water level warning is already output when a specific water level occurs inside a section of the boat in which relevant parts of the boat drive, in particular the drive batteries of the boat drive, are arranged. In this case the water level warning can be output even if there is not yet an immediate danger to the operation of the boat due to water but a corresponding water level has already been reached.

On the basis of the water level warning which the second water sensor 3 communicates to a control system 10 of the boat drive a corresponding notification can then be output to the user of the boat. This notification can be in the form of a warning displayed for example on a display, in the form of an acoustic or visual warning or also in the form of a characteristic behavior of the boat drive, for example deceleration or pulsed operation of the boat drive. In this way the user of the boat drive is prompted to carry out an intervention so that the penetration of water is reduced and the water is removed from the relevant region of the boat, so that the boat drive remains in a safe state.

Furthermore, the control system 10 of the boat drive, to which the second water sensor 3 communicates the water level warning, can initiate measures which further protect the boat drive against damage by water. For example, the control system 10 can automatically start a bilge pump, by means of which the water which has exceeded the water level defined by the second water sensor 3 can be conveyed out of this region of the boat.

Furthermore, the control system 10 can be configured so as to carry out an automatic deceleration of the running of the boat drive in order to reduce the current consumption overall and thus to reduce possible heat evolution of the individual components of the boat drive, so that damage can be reduced in the event of a possible encounter with water. However, this automatic deceleration of the running can be manually overridden again by the driver of the boat, in order to keep the boat maneuverable for as long as possible in dangerous situations.

In a further embodiment the control system 10 can be configured so that already, if the water level corresponds to the second water level 30 of the second water sensor 3, it initiates a sequence for switching off the boat drive, for example by gradually reducing the running speed of the boat drive to zero after the expiration of a predetermined specific time period and then switching off the boat drive and in particular a drive battery.

The first water sensor 2, which has a hardware connection to the boat drive in such a way that faults possibly occurring on the system bus 12 do not influence switching off, is intended to safeguard the boat drive so that the boat drive switches off as soon as safety-critical parts of the boat drive are immersed in water, for example the poles of the drive battery.

If applicable, all individual features which are set out in the exemplary embodiments can be combined with one another and/or exchanged for one another, without departing from the scope of the invention.

List of references
1 device for monitoring a boat drive
10 control system
12 system bus
2 first water sensor
20 first water level
22 emergency off switch
3 second water sensor
30 second water level
32 microprocessor

What is claimed is:

1. A device for monitoring a drive battery of a boat drive, comprising:
    a first water sensor configured to switch off the boat drive when a first water level is reached; and
    a second water sensor configured to output a water level warning when a second water level is reached, wherein the second water sensor communicates by means of a system bus with a control system of the boat drive, such that the control system, in response to receiving the water level warning, operates the boat drive in a decelerated or pulsed continued operation.

2. The device according to claim 1, wherein the first water sensor is arranged above the second water sensor and the first water level is above the second water level.

3. The device according to claim 2, wherein the first water sensor is connected by means of a hardware connection to the drive battery of the boat drive, so as to switch off the boat drive directly when the first water level is reached.

4. The device according to claim 1, wherein the first water sensor is connected by means of a hardware connection to the drive battery of the boat drive, so as to switch off the boat drive directly when the first water level is reached.

5. The device according to claim 4, wherein the first water sensor is arranged in the drive battery of the boat drive.

6. The device according to claim 4, wherein the first water sensor is arranged outside the drive battery of the boat drive and is directly connected by means of the hardware connection to an operating switch of the drive battery.

7. The device according to claim 1, wherein the control system of the boat drive is configured to reduce the power of the boat drive upon reception of the water level warning.

8. The device according to claim 7, wherein the control system is configured so that, upon reception of the water level warning, a sequence for switching off the boat drive is initiated, after the expiration of a predetermined time period.

9. The device according to claim 1, wherein the control system is configured so that, upon reception of the water level warning, a sequence for switching off the boat drive is initiated, after the expiration of a predetermined time period.

10. The device according to claim 1, wherein the first water sensor communicates by means of a system bus with a control system of the boat drive, and the control system is configured to switch off the boat drive upon reception of a switch-off message from the first water sensor.

11. The device according to claim 10, characterized in that the control system is configured to output a warning upon reception of the message about the switching off of the boat drive from the first water sensor.

12. The device according to claim 1, wherein the first water sensor is connected in series to an emergency off switch of the boat drive.

13. The device according to claim 1, further comprising:
- a control system configured so that, upon reception of a water level warning from the second water sensor and/or upon reception of a message about the switching off of the boat drive from the first water sensor, the control system switches on a bilge pump to remove the water from the boat.

\* \* \* \* \*